United States Patent
Hagihara

(10) Patent No.: US 8,710,423 B2
(45) Date of Patent: Apr. 29, 2014

(54) IMAGE PICKUP DEVICE WITH A PLURALITY OF PIXELS AND AN AD CONVERSION CIRCUIT

(75) Inventor: Yoshio Hagihara, Tokyo (JP)

(73) Assignee: Olympus Corporation, Tokyo (JP)

( * ) Notice: Subject to any disclaimer, the term of this patent is extended or adjusted under 35 U.S.C. 154(b) by 223 days.

(21) Appl. No.: 13/291,219

(22) Filed: Nov. 8, 2011

(65) Prior Publication Data

US 2012/0138772 A1    Jun. 7, 2012

(30) Foreign Application Priority Data

Dec. 1, 2010    (JP) ................................. 2010-268559

(51) Int. Cl.
  *H01J 40/14*    (2006.01)
  *G01J 1/44*     (2006.01)

(52) U.S. Cl.
  USPC ............. 250/214 R; 250/208.1; 250/214 DC

(58) Field of Classification Search
  USPC ..... 250/208.1, 214 R, 214.1, 214 DC, 214 A;
    348/241, 300–324, 162, 164, 295;
    257/290–292; 341/126, 133, 135, 136,
    341/155–165; 327/100, 103, 151, 160, 164,
    327/172–176
  See application file for complete search history.

(56) References Cited

U.S. PATENT DOCUMENTS

2007/0019091 A1*  1/2007  Muramatsu et al. .......... 348/308
2009/0244338 A1* 10/2009  Kume .......................... 348/294

FOREIGN PATENT DOCUMENTS

JP    2009-033297 A    2/2009

* cited by examiner

*Primary Examiner* — Georgia Y Epps
*Assistant Examiner* — Carolynn A Moore
(74) *Attorney, Agent, or Firm* — Westerman, Hattori, Daniels & Adrian, LLP

(57) ABSTRACT

An image pickup device may include an image pickup unit in which a plurality of pixels are arranged, the plurality of pixels outputting a first and second pixel signals, and an analog-to-digital (AD) conversion circuit that outputs a digital difference signal. The AD conversion circuit may include a delay circuit that has a plurality of delay devices, the delay circuit outputting a first and second lower phase signals, a latch unit that latches the first and second lower phase signals, a lower counting unit that generates a first and second lower count signals, the lower counting unit generating and outputting a lower difference signal, and a higher counting unit that generates a higher difference signal, subtracts a predetermined number from the higher difference signal, or adds the predetermined number to the higher difference signal, and outputs the higher difference signal after subtraction or addition processing.

5 Claims, 8 Drawing Sheets

IMAGE PICKUP DEVICE WITH A PLURALITY OF PIXELS AND AN AD CONVERSION CIRCUIT

BACKGROUND OF THE INVENTION

1. Field of the Invention

The present invention relates to an image pickup device having an analog-to-digital (AD) conversion circuit.

Priority is claimed on Japanese Patent Application No. 2010-268559, filed Dec. 1, 2010, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

FIG. 7 is a block diagram illustrating a partial configuration of an AD conversion circuit of the related art for measuring an amount of time called a time-to-digital converter (TDC) type AD conversion circuit. A circuit shown in FIG. 7 includes an annular delay circuit 201 in which a plurality of delay devices NAND0 and INV1 to INV8 are connected in a ring shape, a latch circuit 202, which retains an output of the annular delay circuit 201, a binarization circuit (a full-encoder circuit) 203, which binarizes a value retained in the latch circuit 202, a counter circuit 204, which counts one of outputs of the annular delay circuit 201 as a count clock, and a memory circuit 205, which retains outputs of the binarization circuit 203 and the counter circuit 204.

Next, an AD conversion operation will be described. FIG. 8 is a timing chart illustrating an operation timing of the AD conversion circuit of the related art shown in FIG. 7. A logical state of a start pulse StartP is transitioned from a low (L) state to a high (H) state, so that logical states of the delay devices constituting the annular delay circuit 201 are varied in order. Thereby, the pulse circulates within the annular delay circuit 201. After the passage of a predetermined amount of time, the latch circuit 202 retains (latches) an output of the annular delay circuit 201. As shown in FIG. 8, the output of the annular delay circuit 201 corresponds to any one of 9 states (a state 0 to a state 8). The output of the annular delay circuit 201 retained (latched) in the latch circuit 202 is fully encoded (i.e., parallelly encoded) by the binarization circuit 203, so that binary data (a lower count value) is generated. The counter circuit 204 counts an output of the delay device INV8 as a count clock, and generates a count value (a higher count value). The lower count value and the higher count value are retained in the memory circuit 205, and are output to a subsequent circuit as digital data.

The AD conversion circuit as described above may be applied to an image pickup device. Japanese Unexamined Patent Application, First Publication No. 2009-033297 discloses an example in which the AD conversion circuit is arranged inside a column unit provided in correspondence with each pixel column and a signal output from a pixel is AD-converted.

In an image pickup device using the AD conversion circuit according to the example of the related art, when subtraction (correlated double sampling (CDS) processing) is carried out between a first pixel signal corresponding to a reset level when a pixel is reset and a second pixel signal corresponding to an amount of incident light of the pixel, the first pixel signal and the second pixel signal are retained in a column unit, the pixel signals are output in parallel to a binarization circuit and a subtraction (CDS processing) circuit provided outside of the column unit, and digital data is obtained.

In the above-described image pickup device of the related art, an example in which lower phase signals, which are outputs of an annular delay circuit, (or input signals of the latch circuit) have 8-state data and a higher count value, which is an output of a counter circuit, has 9-bit data, will be described.

Naturally, it is necessary to transmit the first pixel signal and the second pixel signal outside the column unit at a high speed with an increase in the number of pixels. Furthermore, if binarization and subtraction (CDS processing) are not carried out within the column unit, it is necessary to output a total of 34 signals including a total of 17 signals including 8 lower phase signals and 9 bits of a higher count value for the first pixel signal and a total of 17 signals including 8 lower phase signals and 9 bits of a higher count value for the second pixel signal.

If the 34 signals are output in accordance with a phase (in synchronization) at a high speed and the binarization and subtraction (CDS processing) are carried out, a circuit scale becomes large and its control becomes complicated. This becomes a factor that hinders speed-up or an increase in the number of pixels in the image pickup device using the above-described configuration. If it is possible to carry out the binarization and subtraction (CDS processing) within the column unit, phase adjustment is simplified because it may be good when 12 bits, that is, 12 data signals, are only output outside the column. Thereby, it is possible to further increase speed-up or the number of pixels.

SUMMARY

The present invention provides an image pickup device capable of carrying out binarization and subtraction within a column unit and simplifying signal phase adjustment.

An image pickup device may include: an image pickup unit in which a plurality of pixels are arranged, each of the plurality of pixels having a photoelectric conversion device, the plurality of pixels outputting a first pixel signal corresponding to a reset level in a first time, the plurality of pixels outputting a second pixel signal corresponding to an amount of incident electromagnetic wave in a second time; and an analog-to-digital (AD) conversion circuit that outputs a digital difference signal corresponding to a difference between the first pixel signal and the second pixel signal. The AD conversion circuit may include: a delay circuit that has a plurality of delay devices connected to each other, the plurality of delay devices delaying a pulse signal, the delay circuit outputting, from the plurality of delay devices, a first lower phase signal in response to the first pixel signal and a second lower phase signal in response to the second pixel signal; a latch unit that latches the first lower phase signal and the second lower phase signal output from the delay circuit; a lower counting unit that generates a first lower count signal in response to the first lower phase signal retained in the latch unit, the lower counting unit generating a second lower count signal in response to the second lower phase signal retained in the latch unit, the lower counting unit generating and outputting a lower difference signal including a flag signal in response to a difference between a count value based on the first lower count signal and a count value based on the second lower count signal; and a higher counting unit that generates a higher difference signal in response to a difference between a count value based on a first higher count signal output in response to the first pixel signal in a predetermined frequency from the delay circuit and a count value based on a second higher count signal output in response to the second pixel signal in a predetermined frequency from the delay circuit, the higher counting unit subtracting a predetermined number from the higher difference signal, or adding the predetermined number to the higher difference signal, based on the flag signal, the higher counting unit outputting the higher difference signal after subtraction or addition processing. The latch unit, the lower counting unit, and the higher counting unit may be arranged for every column or every plurality of columns in a pixel array of the image pickup unit.

The lower counting unit may generate the first lower count signal in response to the first lower phase signal retained in the latch unit, perform one of a count-down operation and a count-up operation in response to the generated first lower count signal, generate the second lower count signal in response to the second lower phase signal retained in the latch unit, and perform the other of the count-down operation and the count-up operation in response to the generated second lower count signal, thereby generate the lower difference signal. The higher counting unit may perform one of the count-down operation and the count-up operation in response to the first higher count signal output in response to the first pixel signal in a predetermined frequency from the delay circuit, and perform the other of the count-down operation and the count-up operation in response to the second higher count signal output in response to the second pixel signal in a predetermined frequency from the delay circuit, thereby generate the higher difference signal.

The lower counting unit may perform the count-down operation if the higher counting unit performs the count-down operation. The lower counting unit may perform the count-up operation if the higher counting unit performs the count-up operation.

The first lower count signal and the second lower count signal may be generated by logical operations on pulses based on thermo-codes of the first lower phase signal retained in the latch unit and the second lower phase signal retained in the latch unit and reference clocks.

The image pickup device may further include a reference signal generation unit that generates a reference signal, the reference signal being increased or decreased with a passage of time, and a comparison unit that compares the reference signal to the first pixel signal or the second pixel signal, the comparison unit ending comparison processing at a timing when the reference signal satisfies a predetermined condition for the first pixel signal or the second pixel signal. The latch unit may latch the first lower phase signal or the second lower phase signal at a timing related to an end of the comparison processing. The higher counting unit may start to generate a first count value or a second count value at a timing related to a start of the comparison processing. The higher counting unit may end the generation of the first count value or the second count value at the timing related to the end of the comparison processing.

According to the present invention, the lower counting unit generates and outputs a lower difference signal including a flag signal in response to a difference between a count value based on a first lower count signal and a count value based on a second lower count signal. The higher counting unit generates a higher difference signal in response to a difference between a count value based on a first higher count signal and a count value based on a second higher count signal, performs subtraction or addition processing of the higher difference signal based on the flag signal, and outputs the higher difference signal after the subtraction or addition processing. Thereby, it is possible to carry out binarization and subtraction within a column unit and simplify signal phase adjustment.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

Figure 1:
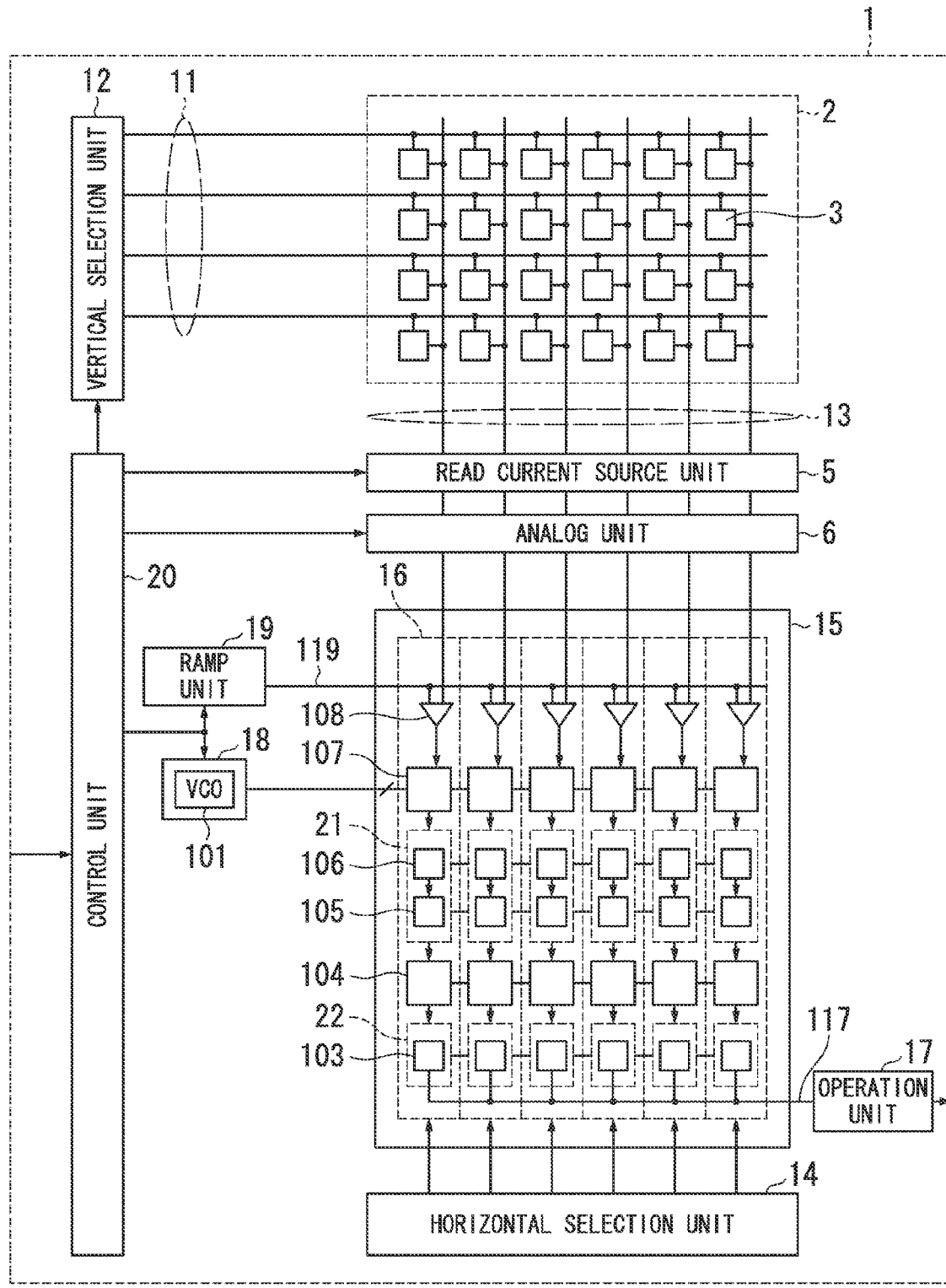
FIG. 1 is a block diagram illustrating an example of a configuration of an image pickup device in accordance with a first preferred embodiment of the present invention.

Hereinafter, a first preferred embodiment of the present invention will be described with reference to the drawings. FIG. 1 is a block diagram illustrating an example of a configuration of a (complementary) metal-oxide semiconductor ((C)MOS) image pickup device in accordance with the first preferred embodiment of the present invention. The image pickup device shown in FIG. 1 includes an image pickup unit 2, a vertical selection unit 12, a read current source unit 5, an analog unit 6, a clock generation unit 18, a ramp unit 19, a column processing unit 15, a horizontal selection unit 14, an operation unit 17, and a control unit 20.

The image pickup unit 2 has a plurality of unit pixels 3 arranged to generate and output signals corresponding to amounts of incident electromagnetic waves in a matrix. The vertical selection unit 12 selects each row of the image pickup unit 2. The read current source unit 5 reads a signal from the image pickup unit 2 as a voltage signal. Although detailed description is omitted, the analog unit 6 has an auto gain control (AGC) circuit having a signal amplification function, and the like, if needed. The clock generation unit 18 generates each clock. The ramp unit 19 generates a reference signal (a ramp wave), which increases or decreases with the passage of time. The column processing unit 15 is connected to the ramp unit 19 via a reference signal line 119. The horizontal selection unit 14 reads AD-converted data and output it to a horizontal signal line 117. The operation unit 17 is connected to the horizontal signal line 117. The control unit 20 controls each part.

Although the image pickup unit 2 including unit pixels 3 of 4 rows×6 columns will be described in FIG. 1, several tens or several tens of thousands of unit pixels 3 are actually arranged in each row or column of the image pickup unit 2. Although not shown, the unit pixel 3 constituting the image pickup unit 2 includes a photoelectric conversion device such as a photodiode/photo gate/photo transistor and a transistor circuit.

Hereinafter, each part will be described in further detail. In the image pickup unit 2, the unit pixels 3 of 4 rows and 6 columns are two-dimensionally arranged and a row control line 11 is wired for every row in a pixel array of the 4 rows and the 6 columns. One end of the row control line 11 is connected to each output terminal corresponding to each row of the vertical selection unit 12. The vertical selection unit 12 includes a shift register, a decoder, or the like, and controls a row address or a row scan of the image pickup unit 2 via the row control line 11 when each unit pixel 3 of the image pickup unit 2 is driven. A vertical signal line 13 is wired for every column in a pixel array of the image pickup unit 2.

The read current source unit 5 includes a current source for reading a signal from the image pickup unit 2 as a voltage signal.

The column processing unit 15 has an AD converter (ADC) unit 16 provided, for example, for every pixel column of the image pickup unit 2, that is, for every vertical signal line 13, and converts an analog pixel signal read through the vertical signal line 13 for every pixel column from each unit pixel 3 of the image pickup unit 2 into digital data. Although the ADC unit 16 is arranged and configured to have a one-to-one correspondence relationship for a pixel column of the image pickup unit 2 in this example, this is only one example. The present invention is not limited to this layout relationship. For example, one ADC unit 16 may be arranged for a plurality of pixel columns, and the one ADC unit 16 may be configured to be used by time division between the plurality of pixel columns. The column processing unit 15 constitutes an AD conversion means, which converts an analog pixel signal read from the unit pixel 3 of a selected pixel row of the image pickup unit 2 into digital pixel data along with the ramp unit 19 and the analog generation unit 18 to be described later. Details of the column processing unit 15, particularly the ADC unit 16, will be described later.

The ramp unit 19 includes, for example, an integral circuit, and its level varies with time in an inclined shape according to control by the control unit 20. A ramp wave is generated and supplied to one of input terminals of a voltage comparison unit 108 via a reference signal line 119. A digital-to-analog converter (DAC) circuit as well as the integral circuit may be used as the ramp unit 19. When a digital ramp wave is configured to be generated using the DAC circuit, it is necessary to finely form the step of the ramp wave or take a configuration equivalent thereto.

The horizontal selection unit 14 includes a shift register, a decoder, or the like, and controls a column address or a column scan of the ADC unit 16 of the column processing unit 15. According to control by the horizontal selection unit 14, digital data after AD conversion by the ADC unit 16 is read to the horizontal signal line 117 in order.

Figure 7:
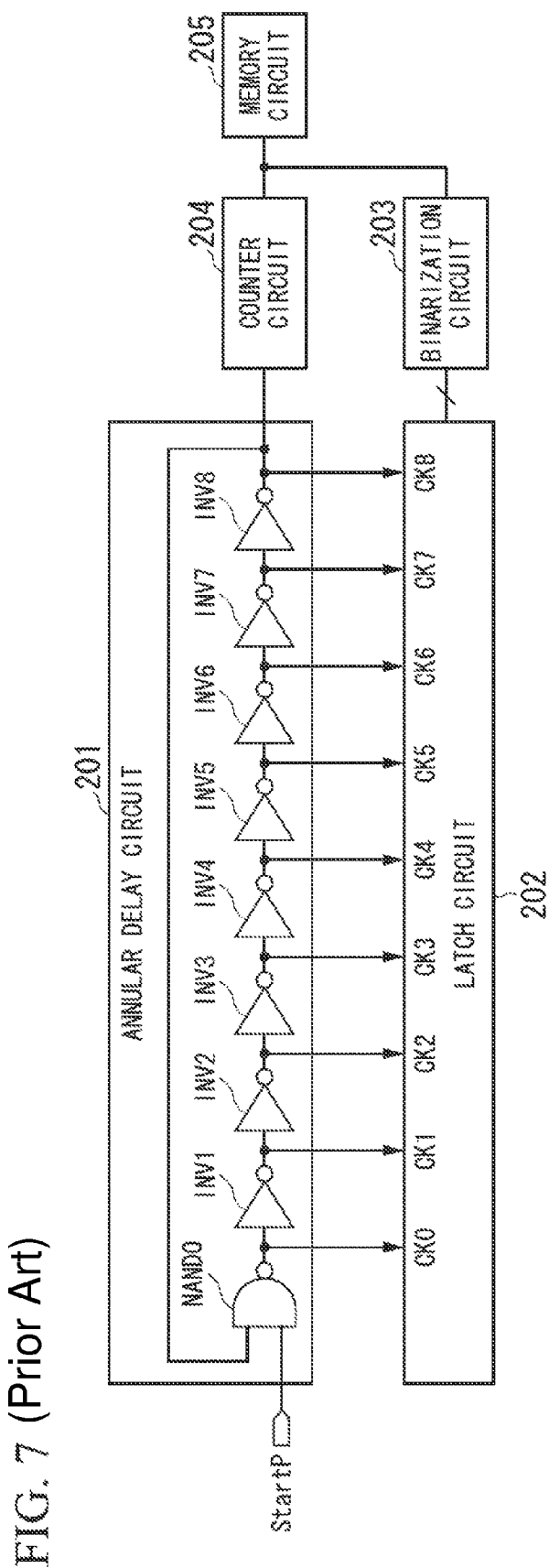
FIG. 7 is a block diagram illustrating a partial configuration of an AD conversion circuit in accordance with the related art.
Figure 8:
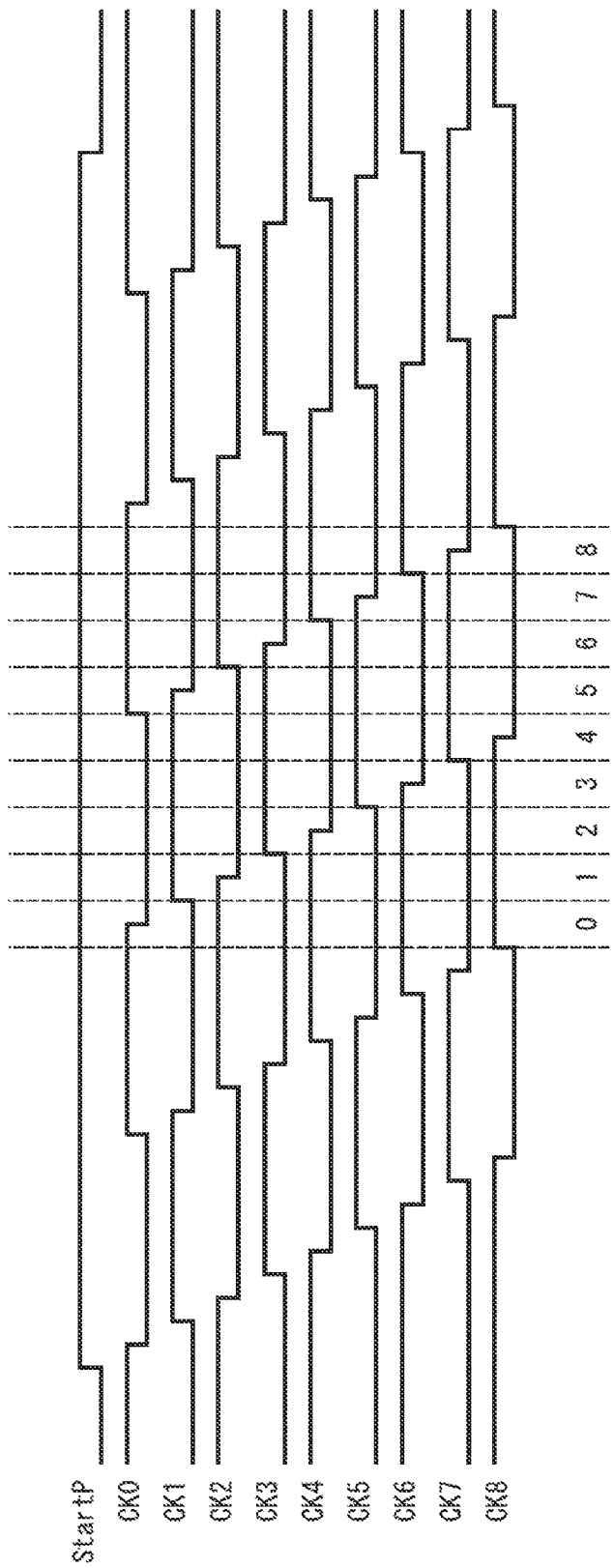
FIG. 8 is a timing chart illustrating an operation timing of the AD conversion circuit in accordance with the related art shown in FIG. 7.

The clock generation unit 18 includes a voltage-controlled oscillator (VCO) 101, which is a delay circuit connected to delay units (inverting devices). If the delay units constituting the VCO 101 are connected, for example, in 8 stages, the VCO 101 outputs 8 phase clocks CK0, CK1, CK2, CK3, CK4, CK5, CK6, and CK7. The delay circuit constituting the VCO 101 may be an annular delay circuit in which a plurality of inverting devices are connected in a ring shape. In this case, although the annular delay circuit, like a symmetric oscillation circuit (for example, the annular delay circuit 201 shown in FIG. 7), includes an odd number of delay units, it is preferable that its output equivalently use an even number (particularly, a power of 2) of asymmetric oscillation circuits. Furthermore, it is possible to use a ring delay line (RDL) circuit in which an annular delay circuit includes an even number (particularly, a power of 2) of delay units or a fully differential type oscillation circuit in which an annular delay circuit includes an even number (particularly, a power of 2) of delay units and furthermore each output of a last stage of a fully differential type inverting circuit constituting delay units is configured to be fed back to an opposite side of a first-stage input.

The operation unit 17 outputs binary digital data. In the operation unit 17, signal processing functions, for example, black level adjustment, column variation correction, color processing, and the like, may be embedded in addition to a buffering function. Furthermore, n-bit parallel digital data may be converted into serial data to be output.

The control unit 20 includes a functional block of a timing generator (TG), which supplies at least one of a clock and a pulse signal of a predetermined timing necessary for an operation of each part such as the ramp unit 19, the clock generation unit 18, the vertical selection unit 12, the horizontal selection unit 14, or the operation unit 17, and a functional block for communicating with the TG.

Next, a configuration of the ADC unit 16 will be described. The ADC unit 16 generates a pulse signal having a magnitude (pulse width) of a time-axis direction corresponding to each magnitude (voltage) of a reset level (reference level) or a signal level by comparing an analog pixel signal read from each unit pixel 3 of the image pickup unit 2 through the vertical signal line 13 to a ramp wave for AD conversion given from the ramp unit 19. The AD conversion is performed by converting data corresponding to a period of the pulse width of the pulse signal into digital data corresponding to the magnitude (voltage) of the pixel signal.

Hereinafter, details of the configuration of the ADC unit 16 will be described. The ADC unit 16 is provided for every column, and 6 ADC units 16 are provided in FIG. 1. The ADC units 16 for the columns have the same configuration. The ADC unit 16 includes a voltage comparison unit 108, a latch unit 107, a lower counting circuit 21 including an operation circuit 106 and a lower counter 105, an output adjustment circuit 104, a switching unit 102, and a higher counting circuit 22 including a higher counter 103. Here, the lower counter 105 and the higher counter 103 are assumed to be counter circuits each combined with a latch function that retains a logical state of each counter.

The voltage comparison unit 108 converts a magnitude (voltage) of a pixel signal into information of a time-axis direction (or a pulse width of a pulse signal) by comparing a signal voltage corresponding to an analog pixel signal output from the unit pixel 3 of the image pickup unit 2 through the vertical signal line 13 to a ramp wave supplied from the ramp unit 19. For example, a comparison output of the voltage comparison unit 108 has an H level when a ramp voltage is greater than the signal voltage, and has an L level when the ramp voltage is less than or equal to the signal voltage.

The latch unit 107 receives the comparison output of the voltage comparison unit 108, and latches (retains/stores) a logical state (lower phase signal) generated by the clock generation unit 18 at the timing when the comparison output is inverted. The lower counting circuit 21 includes the operation circuit 106 and the lower counter 105. The operation circuit 106 generates a lower count signal based on the lower phase signal latched in the latch unit 107. The lower counter 105 counts the lower count signal. Thereby, a lower count value is obtained. The higher counting circuit 22 has the higher counter 103. The higher counter 103 counts a clock signal (higher count signal) output from the clock generation unit 18 and input through the latch unit 107 as a count clock. Thereby, a higher count value is obtained.

Here, the lower phase signal latched in the latch unit 107 is, for example, 8-bit data. In this case, the lower counter 105 is a 3-bit counter circuit. In this embodiment, a counter circuit for a flag is provided to perform an operation for a 1-bit count for the flag to be described later. The lower counter 105 becomes a 4-bit counter circuit when including the counter circuit for the flag. The higher counter 103 is, for example, a 9-bit counter circuit. This is one example and it is not necessary to limit the present invention thereto.

The output adjustment circuit 104 is a circuit for adjusting the higher count value (higher difference signal) of the higher counter 103. Based on a value of the counter circuit for the flag of the lower counter 105, the output adjustment circuit 104 generates a pulse for subtracting a predetermined value from the higher count value of the higher counter 103 or adding the predetermined value to the higher count value of the higher counter 103.

Next, an operation of this example will be described. Here, although the description of a specific operation of the unit pixel 3 is omitted, a reset level and a signal level are output by the unit pixel 3 as is well known.

The AD conversion is performed as follows. For example, a ramp wave falling at a predetermined tilt is compared to each voltage of a reset level or a signal level in a pixel signal from the unit pixel 3. A period until a signal corresponding to the reset level or the signal level is consistent with the ramp wave (ramp voltage) from a point in time when a ramp wave for use in comparison processing has been generated is counted according to a clock (for example, CK7) output from the VCO 101 and also measured in logical states of multi-phase clocks CK0 to CK7 having a fixed phase difference, so that digital data corresponding to each magnitude (voltage) of the reset level or the signal level is obtained.

Here, a reset level including noise of a pixel signal in a first read operation is read as an analog pixel signal from each unit pixel 3 of a selected row of the image pickup unit 2, and then a signal level is read in a second read operation. The reset level and the signal level are input to the ADC unit 16 through the vertical signal line 13 in time series. However, the signal level may be read in the first read operation, and then the reset level may be read in the second read operation. Hereinafter, details of the first and second read operations and subsequent subtraction (CDS processing) will be described.

First Read

Once the first read from the unit pixel 3 of any pixel row to the vertical signal line 13 is stable, the control unit 20 supplies control data of ramp wave generation to the ramp unit 19. Upon receipt of the control data, the ramp unit 19 outputs a ramp wave of which the waveform varies with time in a ramp shape as a whole as a comparison voltage given to one input terminal of the voltage comparison unit 108. The voltage comparison unit 108 compares the ramp wave to the reset level. During this, the higher counter 103 counts a higher count signal, which is a clock signal output from the VCO 101, as a count clock. Although it is preferable that an output start timing of the clock signal of the VCO 101 and an output start timing of the ramp wave be substantially simultaneous, the present invention is not limited thereto.

The voltage comparison unit 108 inverts a comparison output when the ramp wave given from the ramp unit 19 is compared with the reset level and two voltages thereof are substantially consistent with each other (a first timing). At the first timing, the latch unit 107 retains the logical state of the VCO 101 (a first lower phase signal). At the first timing, the higher counter 103 retains the logical state by stopping a count operation. Thereby, a first higher count value corresponding to a first higher count signal is obtained. The control unit 20 stops a supply of control data to the ramp unit 19 and an output from the clock generation unit 18 when a predetermined period has elapsed. Thereby, the ramp unit 19 stops the ramp wave generation.

Thereafter, the lower counting circuit 21 obtains a first lower count value corresponding to the first lower phase signal. The first lower count value and the first higher count value are set as initial values of the lower counter 105 and the higher counter 103 in the second read.

Second Read

Subsequently, during the second read, a signal level corresponding to an amount of incident light of each unit pixel 3 is read and the same operation as the first read is performed. Once the second read from the unit pixel 3 of any pixel row to the vertical signal line 13 is stable, the control unit 20 supplies control data of ramp wave generation to the ramp unit 19. Upon receipt of the control data, the ramp unit 19 outputs a ramp wave of which the waveform varies with time in a ramp shape as a whole as a comparison voltage given to one input terminal of the voltage comparison unit 108. The voltage comparison unit 108 compares the ramp wave to the signal level. During this, the higher counter 103 counts a second higher count signal, which is a clock signal output from the VCO 101, as a count clock. Because subtraction is carried out, a count mode of the higher counter 103 during the first read is different from a count mode of the higher counter 103 during the second read. Although it is preferable that an output start timing of the clock signal of the VCO 101 and an output start timing of the ramp wave be substantially simultaneous, the present invention is not limited thereto.

The voltage comparison unit 108 inverts a comparison output when the ramp wave given from the ramp unit 19 is compared to the signal level and two voltages thereof are substantially consistent with each other (a second timing). At the second timing, the latch unit 107 retains the logical state of the VCO 101 (a second lower phase signal). At the second timing, the higher counter 103 retains the logical state by stopping a count operation. Thereby, a higher difference signal, which is a count value corresponding to a difference between the first higher count value and a second higher count value, is obtained. The control unit 20 stops a supply of control data to the ramp unit 19 and an output from the clock generation unit 18 when a predetermined period has elapsed. Thereby, the ramp unit 19 stops the ramp wave generation.

Thereafter, the lower counting circuit 21 obtains a lower difference signal corresponding to a difference between the first lower count value and a second lower count value. Finally, the output adjustment circuit 104 generates a pulse for adding a predetermined number to the higher difference signal or subtracting the predetermined number from the higher difference signal based on a flag signal included in the lower difference signal. For example, the pulse for the subtraction or addition is not generated if the flag signal has the L level, and the pulse for the subtraction or addition is generated if the flag signal has the H level. The higher difference signal is fixed by adding the predetermined number to the higher difference signal or subtracting the predetermined number from the higher difference signal based on the pulse. Digital data including the lower difference signal and the higher difference signal is output via the horizontal signal line 117 by the horizontal selection unit 14, and is transferred to the operation unit 17.

Thereby, because binarization and subtraction (CDS processing) can be easily carried out within the column unit of the image pickup device, it is possible to implement the image pickup device in which complex phase adjustment and control are unnecessary.

Figure 2:
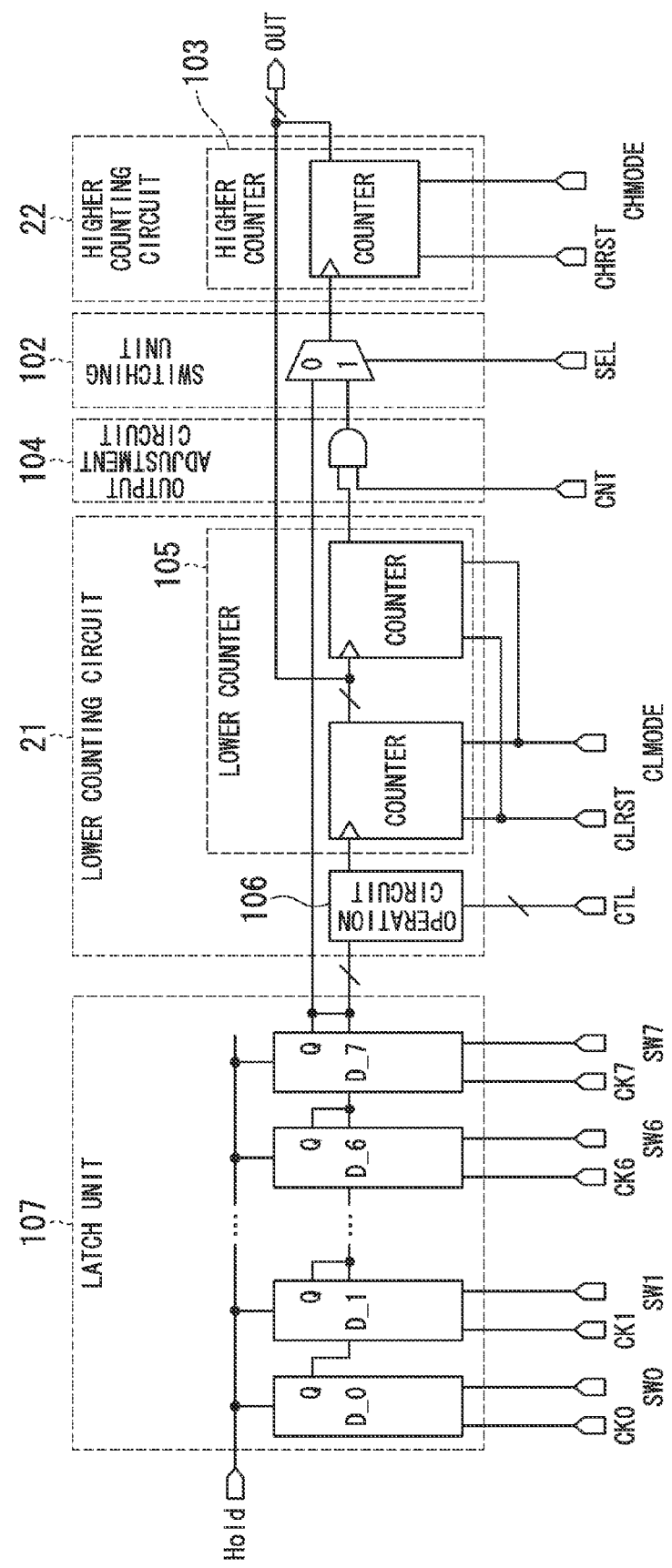
FIG. 2 is a block diagram illustrating an example of a configuration of part of an ADC unit included in the image pickup device in accordance with the first preferred embodiment of the present invention.

Next, details of each configuration of the ADC unit 16 will be described. FIG. 2 is a block diagram illustrating an example of a configuration of part of the ADC unit 16 from which the voltage comparison unit 108 is excluded so as to further describe the ADC unit 16 of FIG. 1. Hereinafter, the configuration shown in FIG. 2 will be described. The configuration shown in FIG. 2 corresponds to the configuration within the ADC unit 16 shown in FIG. 1. The latch unit 107, the lower counting circuit 21, the output adjustment circuit 104, the switching unit 102, and the higher counting circuit 22 are provided. A part including the VCO 101 of FIG. 1 and the configuration shown in FIG. 2 is an example of an AD conversion circuit of the present invention.

The latch unit 107 has latch circuits D_0 to D_7, which latch logical states or lower phase signals (a first lower phase signal and/or a second lower phase signal) at predetermined times of clock signals CK0 to CK7 as outputs of the VCO 101 including delay units according to a control signal Hold corresponding to a comparison output from the voltage comparison unit 108. The lower phase signals latched by the latch unit 107 are output to the lower counting circuit 21 according to control signals SW0 to SW7. The clock signal CK7 input to the latch circuit D_7 of the latch unit 107 is output to the switching unit 102 as the higher count signal for a count operation in the higher counting circuit 22.

The lower counting circuit 21 has the operation circuit 106 and the lower counter 105. The operation circuit 106 carries out an operation on an output of the latch unit 107 according to a control signal CTL, and generates the first lower count signal and the second lower count signal. The lower counter 105 counts the first lower count signal and the second lower count signal, and generates the lower difference signal, which is the difference between a count value based on the first lower count signal and a count value based on the second lower count signal.

The output adjustment circuit 104 has an AND circuit, which carries out an AND operation on the flag signal included in the lower difference signal and a count signal CNT, and outputs a pulse signal for performing subtraction or addition processing for the higher difference signal in the higher counting circuit 22. The switching unit 102 switches a higher count signal, which is an output of the latch unit 107, and an output of the output adjustment circuit 104 according to a control signal SEL. The higher counting circuit 22 has the higher counter 103, which counts an output from the switching unit 102 as a count clock and generates the higher difference signal, which is a difference between a count value based on the first higher count signal and a count value based on the second higher count signal. It is preferable that the predetermined number (8 in FIG. 2), which is the number of clock signals of this example, be a power of 2.

The lower counter 105 and the higher counter 103 include an up/down-counter circuit having a count-up/down mode. A control signal CLRST/CHRST and a control signal CLMODE/CHMODE are input to the lower counter 105/the higher counter 103. The control signal CLRST/CHRST is a signal that controls a reset operation of the lower counter 105/the higher counter 103, and the control signal CLMODE/CHMODE is a signal that switches the count mode of the lower counter 105/the higher counter 103.

The most significant bit (MSB) of the up/down-counter circuit constituting the lower counter 105 corresponds to a counter circuit for a flag for discriminating a positive/negative sign of a count value. In FIG. 2, two counter circuits constituting the lower counter 105 are drawn, and a rear-stage counter circuit corresponds to the counter circuit for the flag. Although it is not necessary to provide the counter circuit for the flag for discriminating the positive/negative sign in the up/down-counter circuit constituting the higher counter 103 in this example, the counter circuit for the flag may be provided in the higher counter 103. It is preferable that the lower counter 105 and the higher counter 103 include, for example, an up/down counter circuit having a data retention function so as to avoid data discontinuity (destruction) that occurs (or is likely to occur) during switching of the count mode described above and a count clock to be described later.

Figure 4:
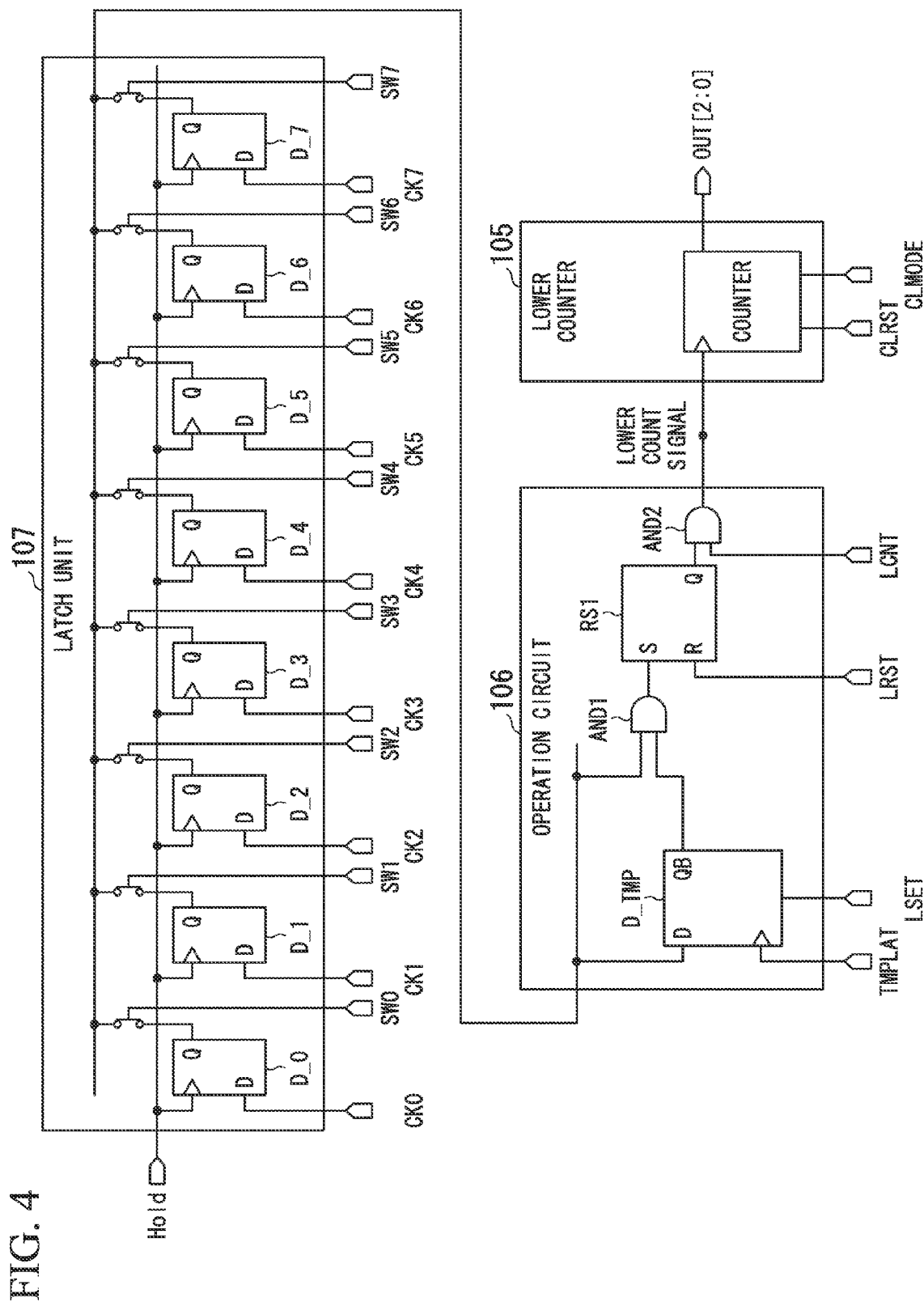
FIG. 4 is a block diagram illustrating an example of an operation circuit and its peripheral configurations in accordance with the first preferred embodiment of the present invention.

When the lower count signal is generated from the lower phase signal, it is preferable to generate the lower count signal by a logical operation on a pulse based on a thermo-code and a reference clock, for example, by use of the configuration shown in FIG. 4, but it is not necessary to limit the present invention to this configuration. Details of FIG. 4 will be described in detail later.

Next, an operation of the configuration shown in FIG. 2 will be described using a specific example. In this description, the case where a 4-bit up/down-counter circuit is used as the lower counter 105 and a 9-bit up/down-counter circuit is used as the higher counter 103 will be described. A fourth bit of the lower counter 105 corresponds to a counter circuit for a flag. The number of states of the lower phase signals based on 8 clock signals, which are outputs of the delay circuit, is 8 (states 0 to 7). If a count operation is performed in the count-up mode, the count value becomes 3'b[0]000, for example, in the state 0, and the count value becomes 3'b[0]111, for example, in the state 7. If the count operation is performed in the count-down mode, the count value becomes 3'b[0]000, for example, in the state 0, and the count value becomes 3'b[1]001, for example, in the state 7.

The notation of the above-described count value will be described. "3'b" indicates that a count value is a 3-bit binary number. "[0]000" indicates an output of the lower counter 105, wherein "[0]" indicates an output of the counter circuit for the flag of the lower counter 105. The same notation is used in the count value of the higher counter 103. The output of the counter circuit for the flag is not included in the count value of the higher counter 103.

Hereinafter, a first example in which subtraction (CDS processing) between a first pixel signal and a second pixel signal subsequent thereto is carried out will be described. Here, it is assumed that a state corresponding to a lower phase signal of the first pixel signal is the state 7, a count value of the higher counting circuit 22 based on the first pixel signal is 3, a state corresponding to a lower phase signal of the second pixel signal is the state 3, and a count value of the higher counting circuit 22 based on the second pixel signal is 5. That is, the first pixel signal corresponds to 31 (=7+8×3), the second pixel signal corresponds to 43 (=3+8×5), and a value obtained by subtraction (CDS processing) of the first pixel signal from the second pixel signal becomes 12.

Initially, the count mode is set to the count-down mode by the control signal CLMODE/CHMODE. Subsequently, count values of the lower counter 105 and the higher counter 103 are reset by the control signal CLRST/CHRST. At this time, the count values are 0. Because the control signal SEL is set to the L state, a count clock of the higher counter 103 is set to an output of the latch circuit D_7 of the latch unit 107. During the operation of the delay circuit, the clock signal CK7 is input to the higher counter 103 via the latch circuit D_7 and the switching unit 102, and the higher counter 103 counts the clock signal CK7 (the first higher count signal) as a count clock.

When a predetermined condition is satisfied a first time (corresponding to the first timing related to a comparison between the ramp wave given from the ramp unit 19 and the reset level in the above-described operation), states of the clock signals CK0 to CK7 at the time are retained. At this time, each state retained in the latch circuits D_0 to D_7 by the control signal Hold corresponds to the first lower phase signal. A result of a count operation performed by the higher counter 103 from a comparison processing start time to the first time corresponds to the first higher count value. At this time, the value retained by the lower counter 105 is 3'b[0]000, and the value retained by the higher counter 103 is 9'b1111_1110_1 (corresponding to −3). If these values are expressed in 12 bits, the expression result becomes 12'b1111_1110_1[0]000.

Figure 5:
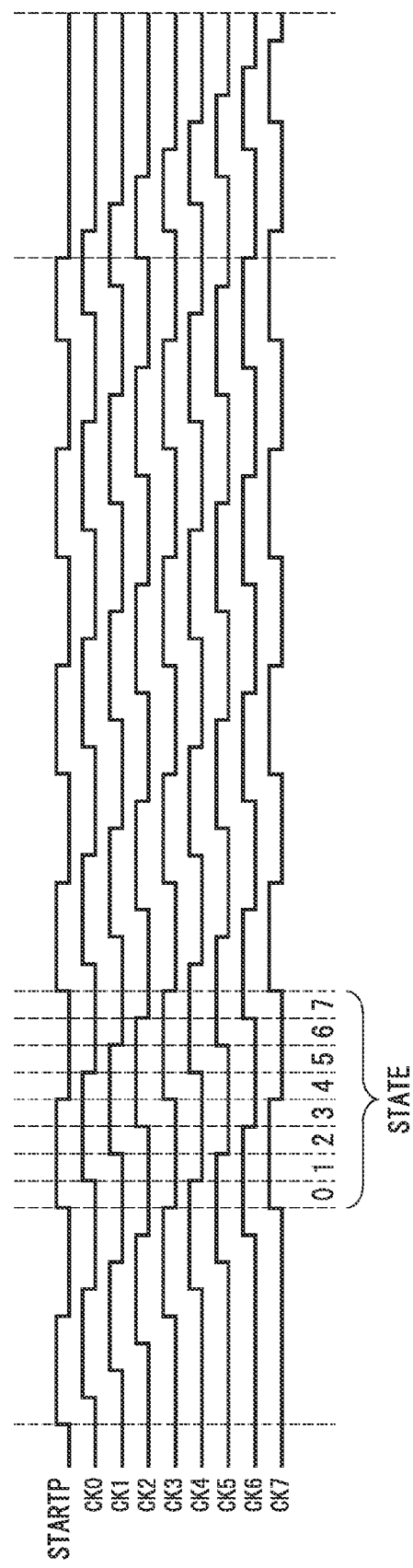
FIG. 5 is a timing chart illustrating an operation during lower count signal generation in accordance with the first preferred embodiment of the present invention.
Figure 6:
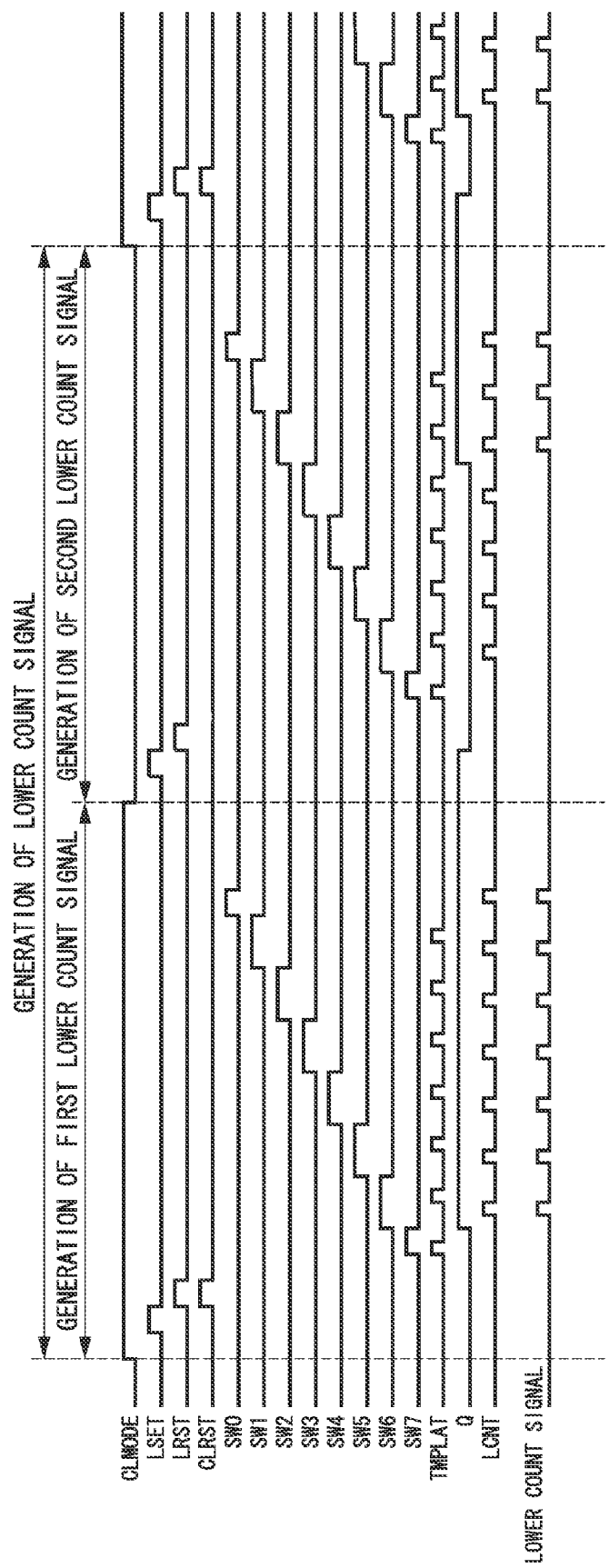
FIG. 6 is a timing chart illustrating an operation during lower count signal generation in accordance with the first preferred embodiment of the present invention.

Subsequently, binarization processing of the first lower phase signal is performed (and generation of the lower count signal will be described later with reference to FIGS. 4 to 6). When the binarization processing of the first lower phase signal ends, the value retained by the lower counter 105 is 3'b[1]001 (corresponding to −7 obtained by counting the state 7), and the value retained by the higher counter 103 is 9'b1111_1110_1 (corresponding to −3). If these values are expressed in 12 bits, the expression result becomes 12'b1111_1110_1[1]001. Thereby, binary data corresponding to the first pixel signal is obtained.

Subsequently, the count mode is set to the count-up mode by the control signal CLMODE/CHMODE. Here, the reset operation of the lower counter 105 and the higher counter 103 is not performed. During the operation of the delay circuit, the clock signal CK7 is input to the higher counter 103 via the latch circuit D-7 and the switching unit 102, and the higher counter 103 counts the clock signal CK7 (the second higher count signal) as a count clock.

When a predetermined condition is satisfied a second time (corresponding to the second timing related to a comparison between the ramp wave given from the ramp unit 19 and the signal level in the above-described operation), states of the clock signals CK0 to CK7 at that time are retained. At this time, each state retained in the latch circuits D_0 to D_7 by the control signal Hold corresponds to the second lower phase signal. A result of a count operation performed by the higher counter 103 from a comparison processing start time to the second time corresponds to a higher difference signal corresponding to a difference between the second higher count value and the first higher count value. At this time, the value retained by the lower counter 105 is 3'b[1]001 (corresponding to −7 obtained by counting the state 7), and the value retained by the higher counter 103 is 9'b0000_0001_0 (corresponding to 2, which is a difference between 5 and 3). If these values are expressed in 12 bits, the expression result becomes 12'b0000_0001_0[1]001.

Subsequently, binarization processing of the second lower phase signal is performed. When the binarization processing of the second lower phase signal ends, the value retained by the lower counter 105 is 3'b[1]100 (corresponding to −4 obtained by counting a difference between the state 3 and the state 7), and the value retained by the higher counter 103 is 9'b0000_0001_0 (corresponding to 2, which is a difference between 5 and 3). If these values are expressed in 12 bits, the expression result becomes 12'b0000_0001_0[1]100. Thereby, temporary binary data corresponding to the difference between the first pixel signal and the second pixel signal is obtained.

Finally, a determination of a flag bit and subtraction are performed. Because the lower count value of the lower counter 105 is a negative number if an output of the counter circuit for the flag of the lower counter 105 is 1, an error of a predetermined number (8 in this example) is included in binary data when the binary data is obtained by directly combining a 3-bit lower count value excluding the output of the counter circuit for the flag with the higher count value. Therefore, in this embodiment, 1 is subtracted from the higher count value of the higher counter 103 so as to correct the error of the predetermined number if the output of the counter circuit for the flag of the lower counter 105 is 1.

If the output of the counter circuit for the flag of the lower counter 105 is 1, the switching unit 102 switches the count clock to an output of the output adjustment circuit 104, and sets the count mode of the higher counter 103 to the count-down mode. In this state, the higher counter 103 counts a pulse generated by the output adjustment circuit 104. At this time, a value retained by the lower counter 105 is 3'b[1]100 (corresponding to −4 obtained by counting a difference between the state 3 and the state 7), and a value retained by the higher counter 103 is 9'b0000_0000_1 (corresponding to 1 obtained by subtracting 1 from 2, which is a difference between 5 and 3). If these values are expressed in 12 bits, the expression result becomes 12'b0000_0000_1[1]100. The lower counter 105 outputs lower data (3'b100), and the higher counter 103 outputs higher data (9'b0000_0000_1). Thereby, binary data corresponding to a difference between the first pixel signal and the second pixel signal is obtained.

Although subtraction from the higher count value of the higher counter 103 is carried out based on the output of the counter circuit for the flag of the lower counter 105 as described above, the same binary data as described above can be obtained by carrying out addition to the higher count value of the higher counter 103 based on the output of the counter circuit for the flag of the lower counter 105 after the count mode of the higher counter 103 is changed from the above.

Hereinafter, a second example in which subtraction (CDS processing) between a first pixel signal and a second pixel signal subsequent thereto is carried out will be described. Here, it is assumed that a state corresponding to a lower phase signal of the first pixel signal is the state 7, a count value of the higher counting circuit based on the first pixel signal is 3, a state corresponding to a lower phase signal of the second pixel signal is the state 3, and a count value of the higher counting circuit based on the second pixel signal is 5. That is, the first pixel signal corresponds to 31 (=7+8×3), the second pixel signal corresponds to 43 (=3+8×5), and a value obtained by subtraction (CDS processing) of the first pixel signal from the second pixel signal becomes 12.

Initially, the count mode of the lower counter 105 is set to the count-down mode by the control signal CLMODE, and the count mode of the higher counter 103 is set to the count-up mode by the control signal CHMODE. Subsequently, count values of the lower counter 105 and the higher counter 103 are reset by the control signal CLRST/CHRST. At this time, the count values are 0. Because the control signal SEL is set to the L state, a count clock of the higher counter 103 is set to an output of the latch circuit D_7 of the latch unit 107. During the operation of the delay circuit, the clock signal CK7 is input to the higher counter 103 via the latch circuit D_7 and the switching unit 102, and the higher counter 103 counts the clock signal CK7 (the first higher count signal) as a count clock.

When a predetermined condition is satisfied a first time (corresponding to the first timing related to a comparison between the ramp wave given from the ramp unit 19 and the reset level in the above-described operation), states of the clock signals CK0 to CK7 at the time are retained. At this time, each state retained in the latch circuits D_0 to D_7 by the control signal Hold corresponds to the first lower phase signal. The result of a count operation performed by the higher counter 103 from a comparison processing start time to the first time corresponds to the first higher count value. At this time, the value retained by the lower counter 105 is 3'b[0]000, and the value retained by the higher counter 103 is 9'b0000_0001_1 (corresponding to 3). If these values are expressed in 12 bits, the expression result becomes 12'b0000_0001_1[0]000.

Subsequently, binarization processing of the first lower phase signal is performed. When the binarization processing of the first lower phase signal ends, the value retained by the lower counter 105 is 3'b[1]001 (corresponding to −7 obtained by counting the state 7), and the value retained by the higher counter 103 is 9'b0000_0001_1 (corresponding to 3). If these values are expressed in 12 bits, the expression result becomes 12'b0000_0001_1[1]001. Thereby, binary data corresponding to the first pixel signal is obtained.

Subsequently, the count mode of the lower counter 105 is set to the count-up mode by the control signal CLMODE, and the count mode of the higher counter 103 is set to the count-down mode by the control signal CHMODE. Here, the reset operation of the lower counter 105 and the higher counter 103 is not performed. During the operation of the delay circuit, the clock signal CK7 is input to the higher counter 103 via the latch circuit D_7 and the switching unit 102, and the higher counter 103 counts the clock signal CK7 (the second higher count signal) as a count clock.

When a predetermined condition is satisfied a second time (corresponding to the second timing related to a comparison between the ramp wave given from the ramp unit 19 and the signal level in the above-described operation), states of the clock signals CK0 to CK7 at the time are retained. At this time, each state retained in the latch circuits D_0 to D_7 by the control signal Hold corresponds to the second lower phase signal. A result of a count operation performed by the higher counter 103 from a comparison processing start time to the second time corresponds to a higher difference signal corresponding to the difference between the second higher count value and the first higher count value. At this time, the value retained by the lower counter 105 is 3'b[1]001 (corresponding to −7 obtained by counting the state 7), and the value retained by the higher counter 103 is 9'b1111_1111_0 (corresponding to −2, which is the difference between 3 and 5). If these values are expressed in 12 bits, the expression result becomes 12'b1111_1111_0[1]001.

Subsequently, binarization processing of the second lower phase signal is performed. When the binarization processing of the second lower phase signal ends, the value retained by the lower counter 105 is 3'b[1]100 (corresponding to −4 obtained by counting the difference between the state 3 and the state 7), and the value retained by the higher counter 103 is 9'b1111_1111_0 (corresponding to −2, which is the difference between 3 and 5). If these values are expressed in 12 bits, the expression result becomes 12'b1111_1111_0[1]100. Thereby, temporary binary data corresponding to the difference between the first pixel signal and the second pixel signal is obtained.

Subsequently, a determination of a flag bit and addition are performed. If the output of the counter circuit for the flag of the lower counter 105 is 1, 1 is added to the higher count value of the higher counter 103. To perform this addition, the switching unit 102 switches the count clock to an output of the output adjustment circuit 104, and sets the count mode of the higher counter 103 to the count-up mode. In this state, the higher counter 103 counts a pulse generated by the output adjustment circuit 104. At this time, the value retained by the lower counter 105 is 3'b[1]100 (corresponding to −4 obtained by counting the difference between the state 3 and the state 7), and the value retained by the higher counter 103 is 9'b1111_1111_1 (corresponding to −1). If these values are expressed in 12 bits, the expression result becomes 12'b1111_1111_1[1]100.

Finally, 1 is subtracted from the higher count value of the higher counter. This subtraction is performed regardless of whether the output of the counter circuit for the flag of the lower counter 105 is 0 or 1. At this time, the value retained by the lower counter 105 is 3'b[1]100 (corresponding to −4 obtained by counting the difference between the state 3 and the state 7), and the value retained by the higher counter 103 is 9'b1111_1111_0 (corresponding to −2). The lower counter 105 outputs lower data (3'b100), and the higher counter 103 outputs higher data (9'b0000_0000_1) by inverting higher data (9'b1111_1111_0). Thereby, binary data corresponding to a difference between the first pixel signal and the second pixel signal is obtained.

In the second example, the count operation of the higher counter 103 is inverse to the first example described above because the higher counter 103 performs the count-down operation after the count-up operation. Because the higher count value is corrected by the inverse count operation as described above, 1 is finally subtracted from the higher count value and the inversion is further performed. This correction corresponds to the inversion of a sign of the higher count value. When the correction of the higher count value based on the output of the counter circuit for the flag of the lower counter 105 is performed, 1 is subtracted from the higher count value in the first example, but 1 is added to the higher count value because the higher count value is corrected before the sign is inverted in the second example.

Figure 3:
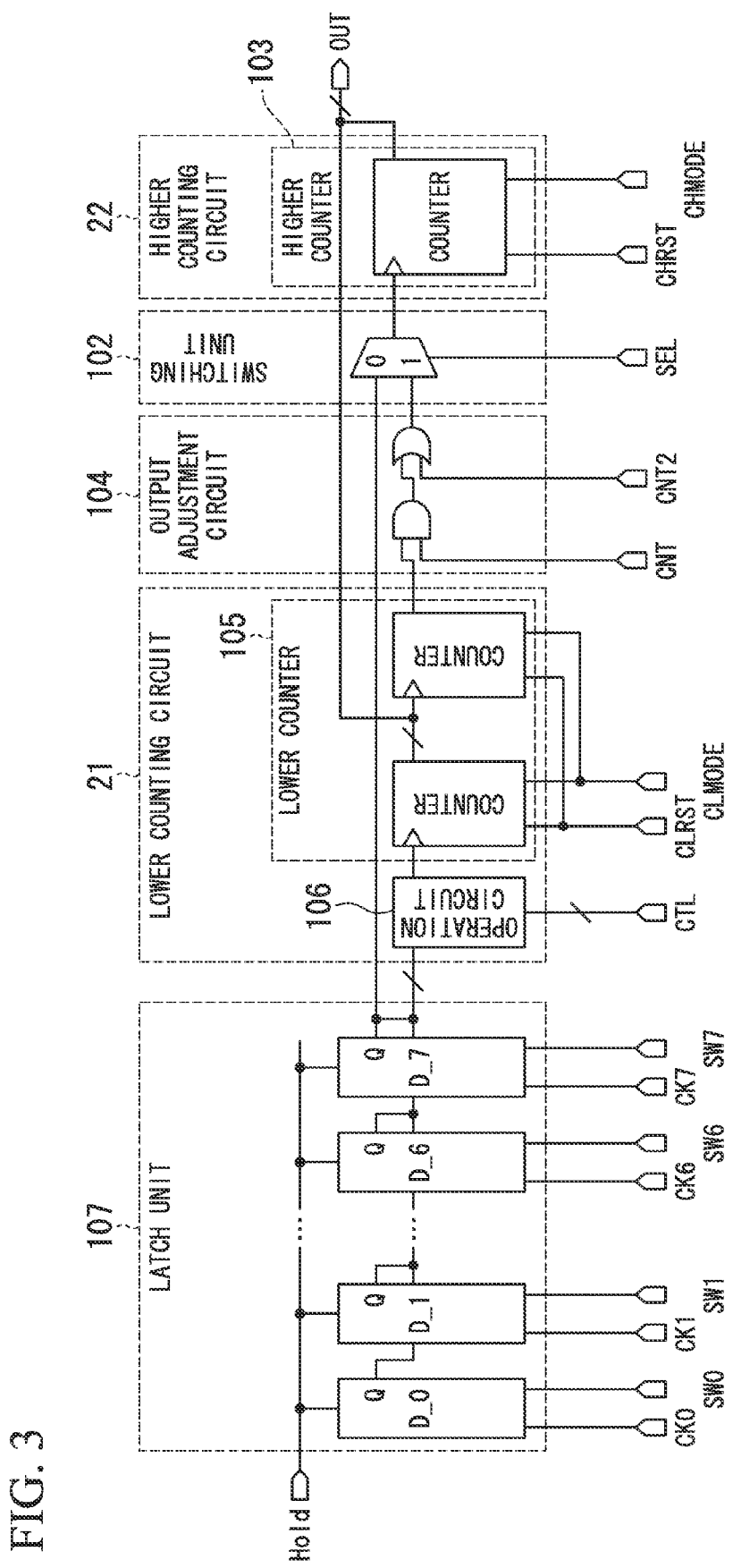
FIG. 3 is a block diagram illustrating another example of a configuration of part of an ADC unit included in the image pickup device in accordance with the first preferred embodiment of the present invention.

If the operation described in the second example is performed, the configuration shown in FIG. 3 is used in place of the configuration shown in FIG. 2. FIG. 3 is a block diagram illustrating another example of the configuration of part of the ADC unit included in the image pickup device in accordance with the first preferred embodiment of the present invention. In FIG. 3, in the output adjustment circuit 104, an OR circuit, which carries out an OR operation on an output of an AND circuit and a count signal CNT2, is added to a subsequent stage of the AND circuit. A configuration other than the OR circuit is the same as the configuration shown in FIG. 2. In the operation described in the second example, the count signal CNT2 is first in the L state, but the count signal CNT2 is in the H state when 1 is subtracted from the higher count value of the higher counter, regardless of the output of the counter circuit for the flag of the lower counter 105, and a pulse is output from the OR circuit. The higher counter 103 subtracts 1 from the higher count value by counting the pulse.

Next, details of the operation circuit 106 will be described. FIG. 4 is a block diagram illustrating an example of the operation circuit 106 and its peripheral configurations for further describing generation of the lower count signal in the operation circuit 106 shown in FIGS. 1 to 3. Among the configurations shown in FIG. 4, the latch unit 107 and the lower counter 105 are the same as described above. Hereinafter, the configuration of the operation circuit 106 will be described.

As shown in FIG. 4, the operation circuit 106 includes a latch circuit D_TMP, an AND circuit AND1, a reset/set (RS) latch RS1, and an AND circuit AND2. The latch circuit D_TMP temporarily retains outputs of the latch circuits D_0 to D_7 according to a pulse signal TMPLAT in a predetermined order. The latch circuit D_TMP is reset by a control signal LSET. The AND circuit AND1 carries out an AND operation on an output of any one of the latch circuits D_0 to D_7 and an inversion output QB of the latch circuit D_TMP.

An output of the AND circuit AND1 and a control signal LRST are input to the RS latch RS1. After the RS latch RS1 is reset by the control signal LRST, an output Q is varied from the L state to the H state when the output of the AND circuit AND1 is varied from the L state to the H state, and then the output Q is maintained in the H state, regardless of the output of the AND circuit AND1, until the RS latch RS1 is reset by the control signal LRST. The AND circuit AND2 carries out an AND operation on an output of the RS latch RS1 and a count signal LCNT (reference clock).

Next, an operation of the operation circuit 106 will be described. FIGS. 5 and 6 are timing charts illustrating an operation during lower count signal generation in accordance with the first preferred embodiment of the present invention. FIG. 5 shows waveforms of the clock signals CK0 to CK7 output from the delay circuit. In FIG. 5, StartP is a pulse signal input to the delay circuit. Each of the states of the clock signals CK0 to CK7 becomes any one of the state 0 to the state 7 shown in FIG. 5. The latch circuits D_0 to D_7 of the latch unit 107 latch the states of the clock signals CK0 to CK7 (lower phase signals) by the control signal Hold. FIG. 6 shows a waveform of each signal related to an operation of generating the lower count signal.

Hereinafter, a specific example in which the first lower count signal is generated from the first lower phase signal and the second lower count signal is generated from the second lower phase signal will be described. Here, it is assumed that a state corresponding to the first lower phase signal is the state 7 and a state corresponding to the second lower phase signal is the state 3. In this example, 7 pulses are generated in the first lower count signal from the first lower phase signal, and 3 pulses are generated in the second lower count signal from the second lower phase signal. Each generated pulse is input as a count clock of the lower counter 105.

First, the operation will be schematically described. A pulse signal corresponding to the lower phase signal is generated by the control signals SW0 to SW7 and the pulse signal TMPLAT, and a thermo-code (in this example, an edge position that is varied from the H state to the L state) is detected based on the pulse. If the result of the AND operation on the output Q of a latch circuit D_* (where * is any one of 0 to 7) and the inversion output QB of the latch circuit D_TMP is in the H state, the H state is input to the RS latch RS1, so that the thereto-code is detected. A pulse of the lower count signal is generated as the result of the AND operation on the output of the RS latch RS1 and the count signal LCNT, and becomes a count clock of the lower counter 105.

Hereinafter, a detailed operation will be described. When a predetermined condition is satisfied a first time (corresponding to the first timing related to a comparison between the ramp wave given from the ramp unit 19 and the reset level in the above-described operation), the control signal Hold is varied, so that states of the clock signals CK0 to CK7 output from the delay circuit are retained in the latch unit 107. At this time, each of the states retained in the latch circuits D_0 to D_7 corresponds to the first lower phase signal.

Subsequently, the count mode of the lower counter 105 is set to the count-down mode by the control signal CLMODE. Furthermore, the latch circuit D_TMP is reset by the control signal LSET, the count value of the lower counter 105 is reset by the control signal CLRST, and the RS latch is reset by the control signal LRST. The lower count value immediately after the reset is 3'b[0]000, and the output Q of the RS latch RS1 is in the L state.

Subsequently, the control signal SW* (where * is 0 to 7) is turned on in a predetermined order. When the control signal SW7 is turned on, a signal of the L state is output from the latch circuit D_7. According to the pulse signal TMPLAT, the inversion output QB of the latch circuit D_TMP is in the L state when being reset by the control signal LSET. The output of the AND circuit AND1 is in the L state by the output of the L state of the latch circuit D_TMP and the output of the L state of the latch circuit D_7. Because an input S of the RS latch RS1 is in the L state, the output Q of the RS latch RS1 is still in the L state.

Subsequently, when the control signal SW6 is turned on, a signal of the H state is output from the latch circuit D_6. According to the pulse signal TMPLAT, the inversion output QB of the latch circuit D_TMP is in the H state based on the output (L) of the latch circuit D_7. The output of the AND circuit AND1 is in the H state by the output of the H state of the latch circuit D_TMP and the output of the H state of the latch circuit D_6. Because the input S of the RS latch RS1 is in the H state, the output Q of the RS latch RS1 is in the H state. A count clock of one pulse from the AND circuit AND2 is output by the output Q of the RS latch RS1 and the count signal LCNT.

Subsequently, if the control signal SW5 is turned on, a signal of the H state from the latch circuit D_5 is output. According to the pulse signal TMPLAT, the inversion output QB of the latch circuit D_TMP is in the L state based on the output (H) of the latch circuit D_6. The output of the AND circuit AND1 is in the L state by the output of the L state of the latch circuit D_TMP and the output of the H state of the latch circuit D_6. The input S of the RS latch RS1 is in the L state, but the output Q of the RS latch RS1 is still in the H state because the control signal LRST input to the RS latch RS1 is in the L state. A count clock of one pulse from the AND circuit AND2 is output by the output Q of the RS latch RS1 and the count signal LCNT.

Thereafter, the control signals SW4 to SW0 are turned on in order, but the output Q of the RS latch RS1 is maintained in the H state because the input S of the RS latch RS1 is maintained in the L state. Thus, when the control signals SW4 to SW0 are turned on in order, the pulse of the count clock from the AND circuit AND2 is output by the output Q of the RS latch RS1 and the count signal LCNT. Therefore, a total of 7 pulses are generated in the first lower count signal serving as the count clock of the lower counter 105. After the count operation is performed by the count clock, the lower count value of the lower counter 105 is 3'b[1]001. According to the above, the generation of the first lower count signal ends.

Subsequently, when a predetermined condition is satisfied a second time (corresponding to the second timing related to a comparison between the ramp wave given from the ramp unit 19 and the signal level in the above-described operation), the control signal Hold is varied, so that states of the clock signals CK0 to CK7 output from the delay circuit are retained in the latch unit 107. At this time, each of the states retained in the latch circuits D_0 to D_7 corresponds to the second lower phase signal.

Subsequently, the count mode of the lower counter 105 is set to the count-up mode by the control signal CLMODE. Furthermore, the latch circuit D_TMP is reset by the control signal LSET, and the RS latch is reset by the control signal LRST. Here, the lower counter 105 is not reset. At this time, the lower count value is 3'b[1]001, and the output Q of the RS latch RS1 is in the L state.

Subsequently, the control signals SW* (where * is 0 to 7) are turned on in a predetermined order. When the control signal SW7 is turned on, a signal of the H state is output from the latch circuit D_7. According to the pulse signal TMPLAT, the inversion output QB of the latch circuit D_TMP is in the L state when being reset by the control signal LSET. The output of the AND circuit AND1 is in the L state by the output of the L state of the latch circuit D_TMP and the output of the H state of the latch circuit D_7. Because the input S of the RS latch RS1 is in the L state, the output Q of the RS latch RS1 is still in the L state.

Subsequently, when the control signal SW6 is turned on, a signal of the L state is output from the latch circuit D_6. According to the pulse signal TMPLAT, the inversion output QB of the latch circuit D_TMP is in the L state based on the output (H) of the latch circuit D_7. The output of the AND circuit AND1 is in the L state by the output of the L state of the latch circuit D_TMP and the output of the L state of the latch circuit D_6. Because the input S of the RS latch RS1 is still in the L state, the output Q of the RS latch RS1 is still in the L state. A pulse of a count clock from the AND circuit AND2 is not output by the output Q of the RS latch RS1 and the count signal LCNT.

Thereafter, the control signals SW5 to SW3 are turned on in order, but the output Q of the RS latch RS1 is maintained in the L state because the input S of the RS latch RS1 is maintained in the L state. Thus, when the control signals SW5 to SW3 are turned on in order, the pulse of the count clock from the AND circuit AND2 is not output by the output Q of the RS latch RS1 and the count signal LCNT.

Subsequently, when the control signal SW2 is turned on, a signal of the H state is output from the latch circuit D_2. According to the pulse signal TMPLAT, the inversion output QB of the latch circuit D_TMP is in the H state based on the output (L) of the latch circuit D_3. The output of the AND circuit AND1 is in the H state by the output of the H state of the latch circuit D_TMP and the output of the H state of the latch circuit D_2. Because the input S of the RS latch RS1 is in the H state, the output Q of the RS latch RS1 is in the H state. A pulse of a count clock from the AND circuit AND2 is output by the output Q of the RS latch RS1 and the count signal LCNT.

Thereafter, the control signals SW1 to SW0 are turned on in order, but the output Q of the RS latch RS1 is maintained in the H state because the input S of the RS latch RS1 is maintained in the L state. Thus, when the control signals SW1 to SW0 are turned on in order, the pulse of the count clock from the AND circuit AND2 is output by the output Q of the RS latch RS1 and the count signal LCNT. Therefore, a total of 3 pulses are generated in the second lower count signal serving as the count clock of the lower counter 105. After the count operation is performed by the count clock, the lower count value of the lower counter 105 is 3'b[1]100. The count value is the same as the lower difference signal corresponding to the first lower phase signal and the second lower phase signal described above. According to the above, the generation of the second lower count signal ends. According to the configuration shown in FIG. 4, it is possible to implement a circuit for generating a lower count signal from a lower phase signal by an easy circuit configuration.

According to the first preferred embodiment as described above, it is possible to perform binarization of a plurality of pixel signals and subtraction within a column unit, and simplify signal phase adjustment. It is possible to perform difference processing of a pixel signal by an easy circuit configuration by counting a lower count value and a higher count value by use of an up/down-counter.

As in the first example described above, the count modes of the higher counter 103 and the lower counter 105 are provided so that the lower counter 105 also performs the count-down operation when the higher counter 103 performs the count-down operation and the lower counter 105 also performs the count-up operation when the higher counter 103 performs the count-up operation. Therefore, these count operations are easily controlled.

It is possible to easily generate a lower count signal by a logical operation (AND operation) on a pulse based on a thermo-code (the output Q of the RS latch RS1) and a reference clock (count signal LCNT).

It is possible to configure a high-speed single-slope type image pickup device in an easy circuit configuration by controlling generation of a lower phase signal and a higher count value at a timing related to a comparison between a ramp wave generated by the ramp unit 19 and a pixel signal.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the invention is not to be considered as being limited by the foregoing description, and is only limited by the scope of the claims.

What is claimed is:

1. An image pickup device comprising:
   an image pickup unit in which a plurality of pixels are arranged, each of the plurality of pixels having a photoelectric conversion device, the plurality of pixels outputting a first pixel signal corresponding to a reset level in a first time, the plurality of pixels outputting a second pixel signal corresponding to an amount of incident electromagnetic wave in a second time; and
   an analog-to-digital (AD) conversion circuit that outputs a digital difference signal corresponding to a difference between the first pixel signal and the second pixel signal, and wherein
   the AD conversion circuit comprises:
      a delay circuit that has a plurality of delay devices connected to each other, the plurality of delay devices delaying a pulse signal, the delay circuit outputting, from the plurality of delay devices, a first lower phase signal in response to the first pixel signal and a second lower phase signal in response to the second pixel signal;
      a latch unit that latches the first lower phase signal and the second lower phase signal output from the delay circuit;
      a lower counting unit that generates a first lower count signal in response to the first lower phase signal retained in the latch unit, the lower counting unit generating a second lower count signal in response to the second lower phase signal retained in the latch unit, the lower counting unit generating and outputting a lower difference signal including a flag signal in response to a difference between a count value based on the first lower count signal and a count value based on the second lower count signal; and a higher counting unit that generates a higher difference signal in response to a difference between a count value based on a first higher count signal output in response to the first pixel signal in a predetermined frequency from the delay circuit and a count value based on a second higher count signal output in response to the second pixel signal in a predetermined frequency from the delay circuit, the higher counting unit subtracting a predetermined number from the higher difference signal, or adding the predetermined number to the higher difference signal, based on the flag signal, the higher counting unit outputting the higher difference signal after subtraction or addition processing, and the latch unit, the lower counting unit, and the higher counting unit are arranged for every column or every plurality of columns in a pixel array of the image pickup unit.

2. The image pickup device according to claim 1, wherein the lower counting unit generates the first lower count signal in response to the first lower phase signal retained in the latch unit, performs one of a count-down operation and a count-up operation in response to the generated first lower count signal, generates the second lower count signal in response to the second lower phase signal retained in the latch unit, and performs the other of the count-down operation and the count-up operation in response to the generated second lower count signal, thereby generates the lower difference signal, and the higher counting unit performs one of the count-down operation and the count-up operation in response to the first higher count signal output in response to the first pixel signal in a predetermined frequency from the delay circuit, and performs the other of the count-down operation and the count-up operation in response to the second higher count signal output in response to the second pixel signal in a predetermined frequency from the delay circuit, thereby generates the higher difference signal.

3. The image pickup device according to claim 2, wherein
the lower counting unit performs the count-down operation if the higher counting unit performs the count-down operation, and the lower counting unit performs the count-up operation if the higher counting unit performs the count-up operation.

4. The image pickup device according to claim 2, wherein the first lower count signal and the second lower count signal are generated by logical operations on pulses based on thermo-codes of the first lower phase signal retained in the latch unit and the second lower phase signal retained in the latch unit and reference clocks.

5. The image pickup device according to claim 1, further comprising:

a reference signal generation unit that generates a reference signal, the reference signal being increased or decreased with a passage of time; and a comparison unit that compares the reference signal to the first pixel signal or the second pixel signal, the comparison unit ending comparison processing at a timing when the reference signal satisfies a predetermined condition for the first pixel signal or the second pixel signal, and wherein the latch unit latches the first lower phase signal or the second lower phase signal at a timing related to an end of the comparison processing, the higher counting unit starts to generate a first count value or a second count value at a timing related to a start of the comparison processing, and the higher counting unit ends the generation of the first count value or the second count value at the timing related to the end of the comparison processing.

* * * * *